US010509157B2

(12) United States Patent
Liu et al.

(10) Patent No.: US 10,509,157 B2
(45) Date of Patent: Dec. 17, 2019

(54) LIGHTGUIDES WITH PIXELATED IMAGE

(71) Applicant: 3M INNOVATIVE PROPERTIES COMPANY, St. Paul, MN (US)

(72) Inventors: Tao Liu, Woodbury, MN (US); Brent A. Hedding, Hudson, WI (US); David C. Mercord, Prescott, WI (US); Brian W. Ostlie, Hudson, WI (US); David A. Ender, New Richmond, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/751,213

(22) PCT Filed: Aug. 25, 2016

(86) PCT No.: PCT/US2016/048733
§ 371 (c)(1),
(2) Date: Feb. 8, 2018

(87) PCT Pub. No.: WO2017/040212
PCT Pub. Date: Mar. 9, 2017

(65) Prior Publication Data
US 2018/0231708 A1      Aug. 16, 2018

Related U.S. Application Data

(60) Provisional application No. 62/211,062, filed on Aug. 28, 2015.

(51) Int. Cl.
*F21V 7/04*          (2006.01)
*F21V 8/00*          (2006.01)

(52) U.S. Cl.
CPC ........... *G02B 6/0036* (2013.01); *G02B 6/006* (2013.01); *G02B 6/0065* (2013.01); *G02B 6/0068* (2013.01)

(58) Field of Classification Search
None
See application file for complete search history.

(56) References Cited

U.S. PATENT DOCUMENTS

| 1,930,359 | A | 10/1933 | Hilgenberg |
| 5,845,038 | A | 12/1998 | Lundin |
| 7,762,704 | B2 | 7/2010 | Brychell |
| 8,834,004 | B2 | 9/2014 | Thompson |
| 2009/0073721 | A1 | 3/2009 | Kamikatano |
| 2009/0180296 | A1 | 7/2009 | Chen |

(Continued)

FOREIGN PATENT DOCUMENTS

| WO | WO 2010-021896 | 2/2010 |
| WO | WO 2014-105408 | 7/2014 |
| WO | WO 2014-105470 | 7/2014 |

OTHER PUBLICATIONS

International Search Report for PCT International Application No. PCT/US2016/048733, dated Nov. 28, 2016, 3pgs.

*Primary Examiner* — Vip Patel
(74) *Attorney, Agent, or Firm* — Yufeng Dong

(57) ABSTRACT

Lightguides including pixelated images, and methods of making the lightguides are provided. The lightguides include an image formed on a major side which is illuminated for directly viewing. The image includes an elongated portion being pixelated into an array of pixels. Each of the pixels includes a single light extracting structure adapted to receive the propagating light within the lightguide along the optical axis and extract the received light transversely out of the lightguide.

20 Claims, 7 Drawing Sheets

(56) References Cited

U.S. PATENT DOCUMENTS

2009/0244690 A1    10/2009   Lee
2011/0277361 A1    11/2011   Nichol
2012/0099343 A1    4/2012   Ender
2013/0314944 A1    11/2013   McCollum

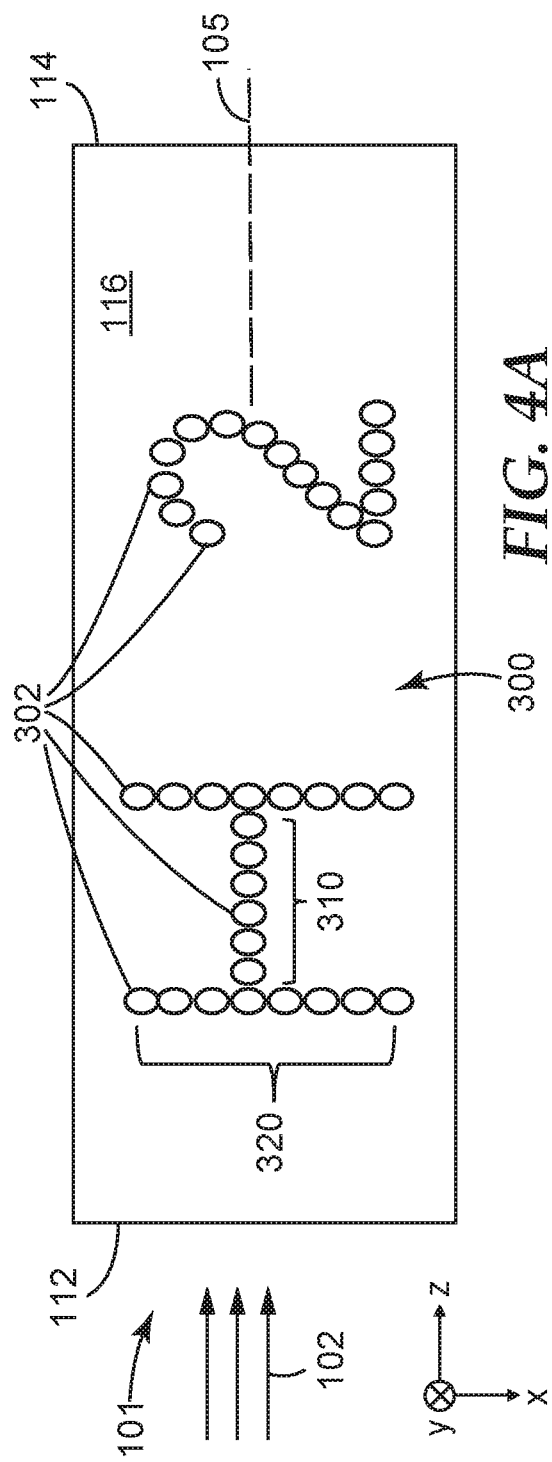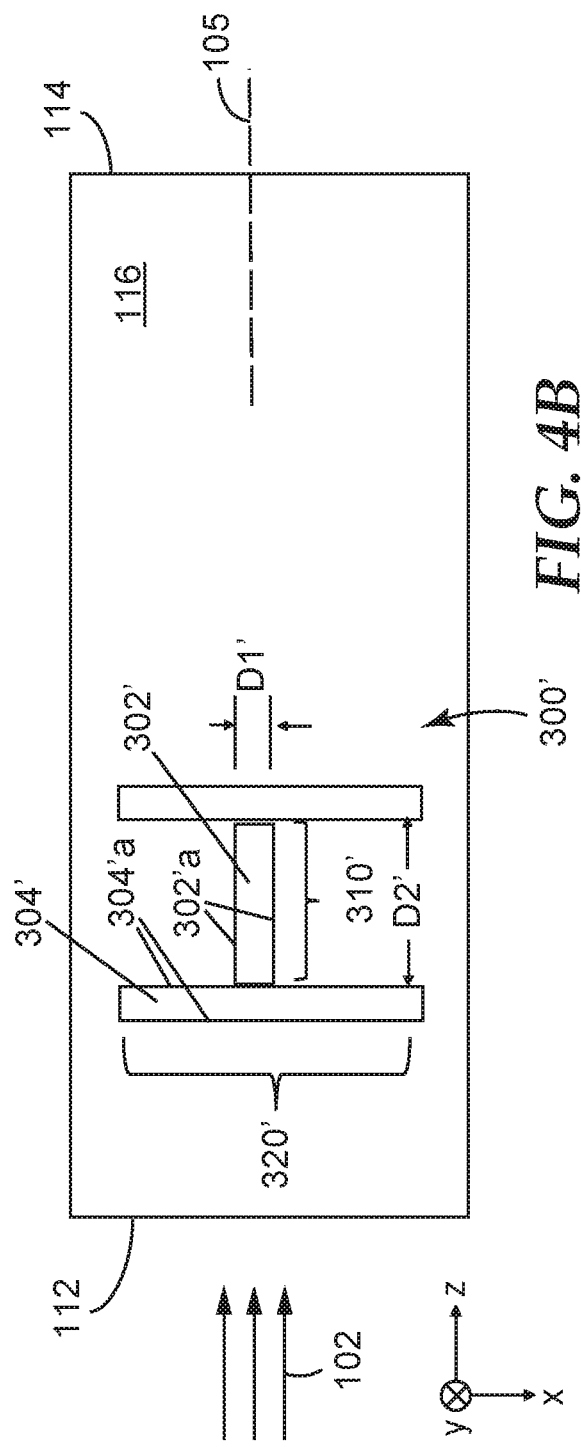

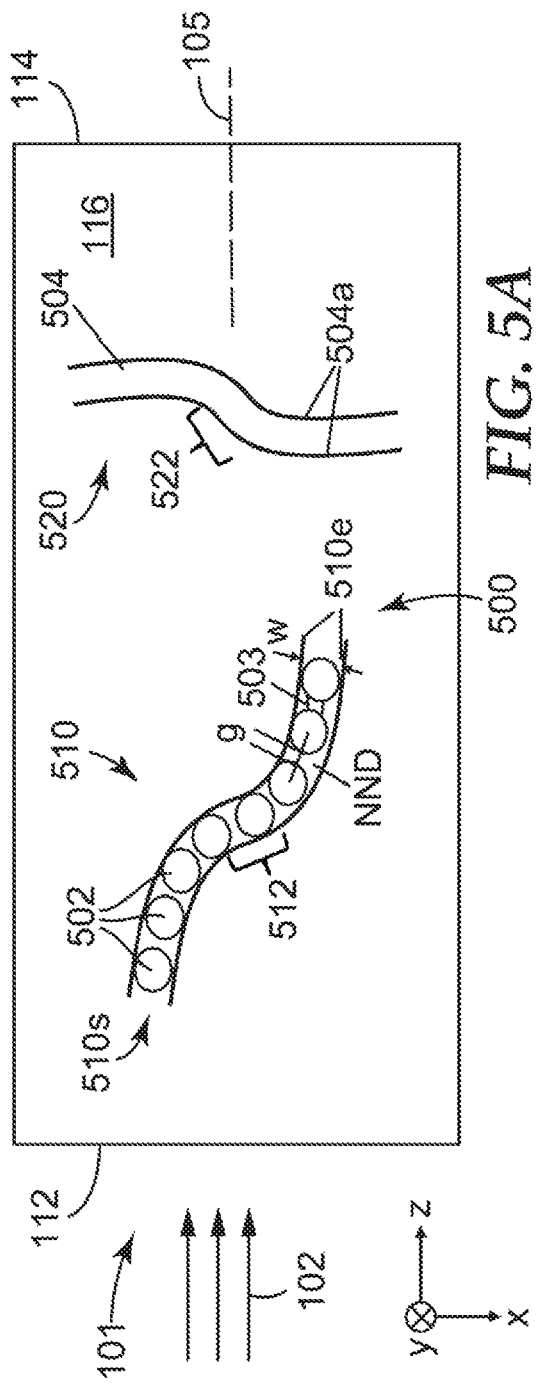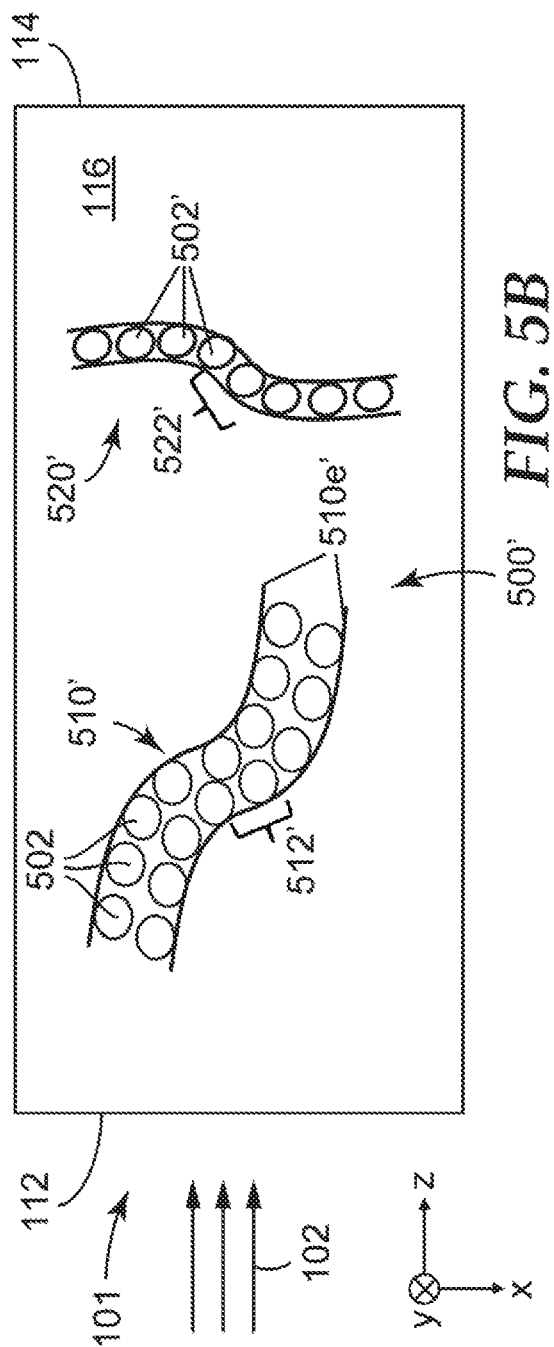

LIGHTGUIDES WITH PIXELATED IMAGE

CROSS REFERENCE TO RELATED APPLICATIONS

This application is a national stage filing under 35 U.S.C. 371 of PCT/US2016/048733, filed Aug. 25, 2016, which claims the benefit of U.S. Application No. 62/211,062, filed Aug. 28, 2015, the disclosure of which is incorporated by reference in its/their entirety herein.

TECHNICAL FIELD

The present disclosure relates to lightguides with a pixelated image including an array of pixels each being a single light extractors, and methods of making and using the lightguides.

BACKGROUND

Lightguides are increasingly being used for decorative and functional lighting purposes in various locations, some of which require the lightguide to emit light selectively (e.g., comparatively uniformly or in a particular direction) along its length. Such lightguides may be referred to as sidelightguides. Various mechanisms are known for enabling light that is injected into a lightguide from a light source at one end or two ends to be extracted selectively from the lightguide along its length to provide, effectively, a linear lighting device. It is recognized that the use of lightguides in linear lighting devices may offer advantages that include, e.g., the use a low voltage light source such as a light emitting diode (LED) light source, separation of the light source from the area in which the lighting device is located, etc.

SUMMARY

Briefly, in one aspect, the present disclosure describes a lightguide centered on an optical axis and adapted to receive an incident light from an input face of the lightguide. The received light propagates within the lightguide along the optical axis. The lightguide includes a lightguide body extending along the optical axis. The lightguide body has a major side including an image formed thereon, and the propagating light illuminates the image formed on the major side for displaying information. The image includes a first elongated portion and a second elongated portion. The first elongated portion extends primarily along a first direction substantially parallel to the optical axis, and the second elongated portion extends primarily along a second direction substantially perpendicular to the optical axis. The first elongated portion is pixelated into an array of pixels, each pixel including a single light extracting structure adapted to receive the propagating light within the lightguide along the optical axis and extract the received light transversely out of the lightguide.

In another aspect, the present disclosure describes a method of making a lightguide. The method includes providing a lightguide centered on an optical axis and adapted to receive an incident light from an input face of the lightguide. The received light propagates within the lightguide along the optical axis. The lightguide includes a lightguide body extending along the optical axis. The lightguide body has a major side. The method further includes forming an image on the major side of the lightguide body. The propagating light is capable of illuminating the image formed on the major side for displaying information. The image includes a first elongated portion and a second elongated portion, the first elongated portion extending primarily along a first direction substantially parallel to the optical axis, and the second elongated portion extending primarily along a second direction substantially perpendicular to the optical axis. The first elongated portion is pixelated into an array of pixels, each pixel comprising a single light extracting structure adapted to receive the propagating light within the lightguide along the optical axis and extract the received light transversely out of the lightguide.

Various unexpected results and advantages are obtained in exemplary embodiments of the disclosure. One such advantage of exemplary embodiments of the present disclosure is that an image or pattern formed on a lightguide and illuminated for directly viewing exhibits improved uniformity across the image or pattern by pixelating at least a portion of the image or pattern, in particular, an elongated portion extending primarily along a direction substantially parallel to an optical axis of the lightguide.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 4A is a top view of a lightguide with a pixelated image, according to one embodiment.

FIG. 4B is a top view of a lightguide with an image corresponding to the pixelated image of FIG. 4A.

FIG. 5A is a top view of a lightguide with a partially pixelated image, according to one embodiment.

FIG. 5B is a top view of a lightguide with a pixelated image, according to another embodiment.

Figure 1:
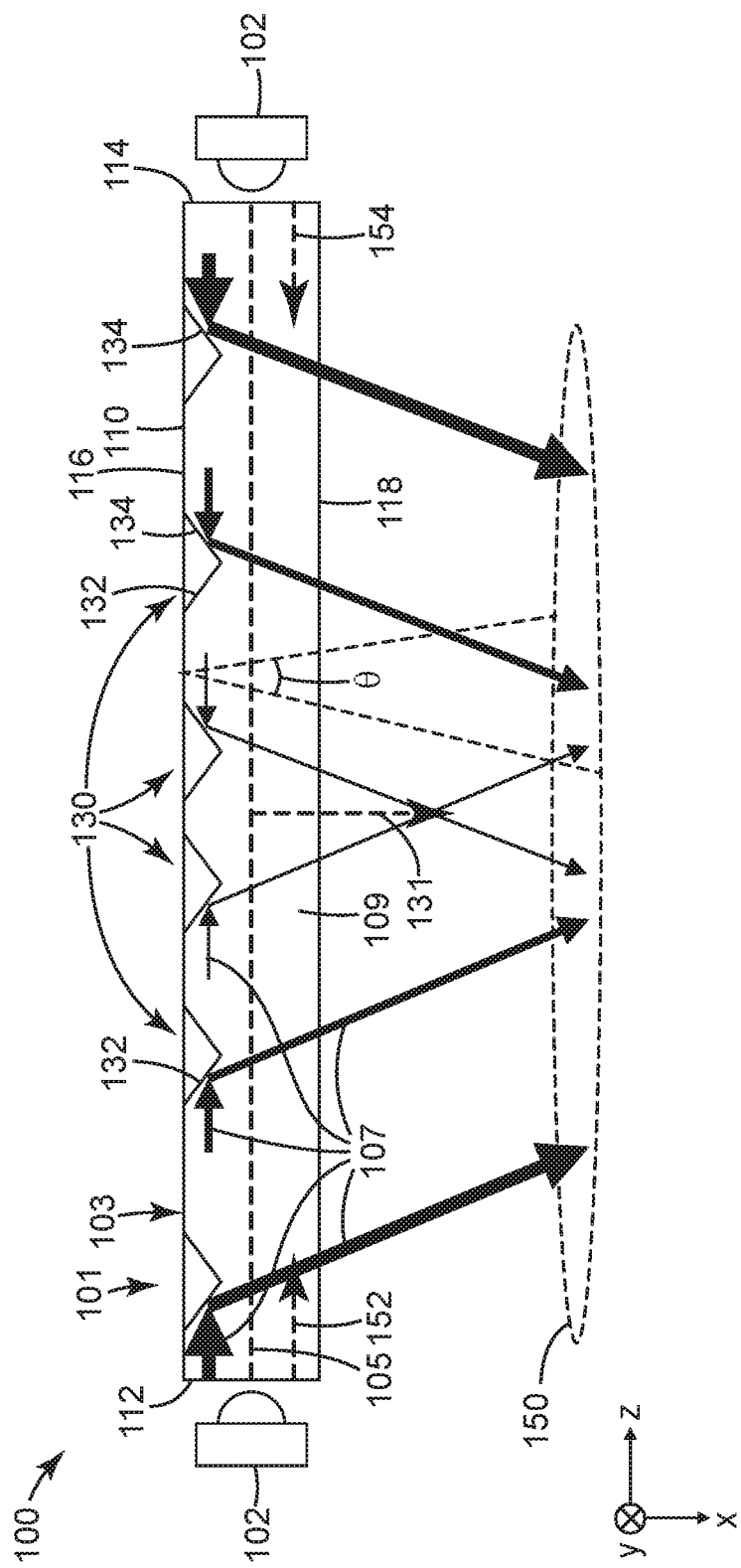
FIG. 1 is a diagrammatic view of a lightguide, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that:

The term "extending primarily along a direction" refers to an elongated portion of an image or pattern that is oriented such that a longitudinal component of the elongated portion along the direction is greater than a transverse component of the elongated portion along a perpendicular direction when projecting the elongated portion into two orthogonal directions (e.g., two of x-axis, y-axis, and z-axis in a Cartesian x-y-z coordinate system).

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

The terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

FIG. 1 illustrates a lightguide system 100, according to one embodiment. The lightguide system 100 includes a lightguide 101 that may be described as being a side-emitting lightguide that is configured to receive light from either end of the lightguide 101 and redirect, or reflect, the received light along one or more sides of the lightguide 101 along at least a portion of the length of the lightguide 101 (e.g., a plurality of portions of the length, the entire length, etc.). The light sources 102 may be any device cable of emitting light such as, e.g., light emitting diodes, fluorescent lights, noble gas lights, incandescent lights, etc.

A Cartesian x-y-z coordinate system is shown in FIG. 1. The lightguide 101 has an optical axis 105 that is substantially parallel to the z-axis. The lightguide 101 is configured such incident light from the light sources 102 is injected into an end of the lightguide 101 propagates along the lightguide 101 in the z-direction. The lightguide 101 includes a body 103 extending along the optical axis 105 and an array of light extracting structures 130. The body 103 extends from a first end 112 to a second end 114 along the optical axis 105. The body 103 further defines a first, or top, major side 116 and a second, or bottom, major side 118 opposite the first major side 116. While two light sources 102 are shown in FIG. 1, it is to be understood that in some embodiments, a single light source 102 can be used and located at one of the ends 112 and 114. One or more additional light sources may be disposed on sides of the lightguide 101 other than 112, 114, 116 and 118, for example, the sides facing into or out of the page. Also, in some embodiments, the body 103 may include more than two ends (e.g., three ends, four ends, etc.) and may extend in multiple directions (e.g., three directions, four directions, etc.) with each end/direction including its own light source.

The body 103 of the lightguide 101 defines a length extending from the first end 112 to the second end 114. In some embodiments, the length may be, for example, greater than or equal to about 200 millimeters (mm), greater than or equal to about 500 mm, greater than or equal to about 1000 mm, greater than or equal to about 2 meters, greater than or equal to about 3 meters, greater than or equal to about 5 meters, greater than or equal to about 10 meters, greater than or equal to about 20 meters, greater than or equal to about 30 meters, greater than or equal to about 50 meters, etc. and/or less than or equal to about 1000 mm, less than or equal to about 2 meters, less than or equal to about 3 meters, less than or equal to about 5 meters, less than or equal to about 10 meters, less than or equal to about 20 meters, less than or equal to about 30 meters, less than or equal to about 50 meters, less than or equal to about 100 meters, etc. The body 103 of the lightguide 101 can also define a thickness measured as a distance between the opposite sides 116 and 118. In some embodiments, the thickness of a solid body 103 can be, for example, in a range from about 0.1 mm to about 25 cm. In some embodiments, the thickness of a hollow body 103 which has a hollow inside can be, for example, in a range from about 1 cm to about 50 cm.

The body 103 of the lightguide 101 may include (e.g., be formed of) one or more materials such as, e.g., one or more polymers (e.g., urethanes, acrylics, polycarbonates, etc.), glass, etc. The lightguide 101 may be flexible (e.g., resilient etc.) or rigid (e.g., inflexible, unbendable, not resilient, etc.). The body 103 may be formed, or manufactured, using any suitable process such as, e.g., molding, extruding, printing, deposition, etc. In at least one embodiment, the body 103 may be formed by injection molding. In some embodiments, the lightguide 101 can be a fiber lightguide.

In some embodiments, the body 103 can be a solid body where light propagates within the lightguide 101 primarily by undergoing total internal reflection in two orthogonal transverse directions in the x-y plane orthogonal to the optical axis 105. In other embodiments, the lightguide 101 can be a hollow lightguide where the body 103 can be a hollow body that includes an outside surface (e.g., including the major sides 116 and 118 of FIG. 1) and a hollow inside enclosed by the outside surface. The lightguide 101 may include highly reflective back reflector, for example, on the side 118 to enhance light propagation, and light can be extracted from the side 116.

The body 103 of the lightguide 101 may define various different cross-sectional shapes when taken across the optical axis 105 (e.g., in the x-y plane). In some embodiments, the body 103 may define a circular or round cross-sectional shape, a rectangular cross-sectional shape, a teardrop cross-sectional shape, an oval cross-sectional shape, a mushroom cross-sectional shape, a square cross-sectional shape, a wedge cross-sectional shape, any polygonal cross-sectional shape, etc.

Figure 2:
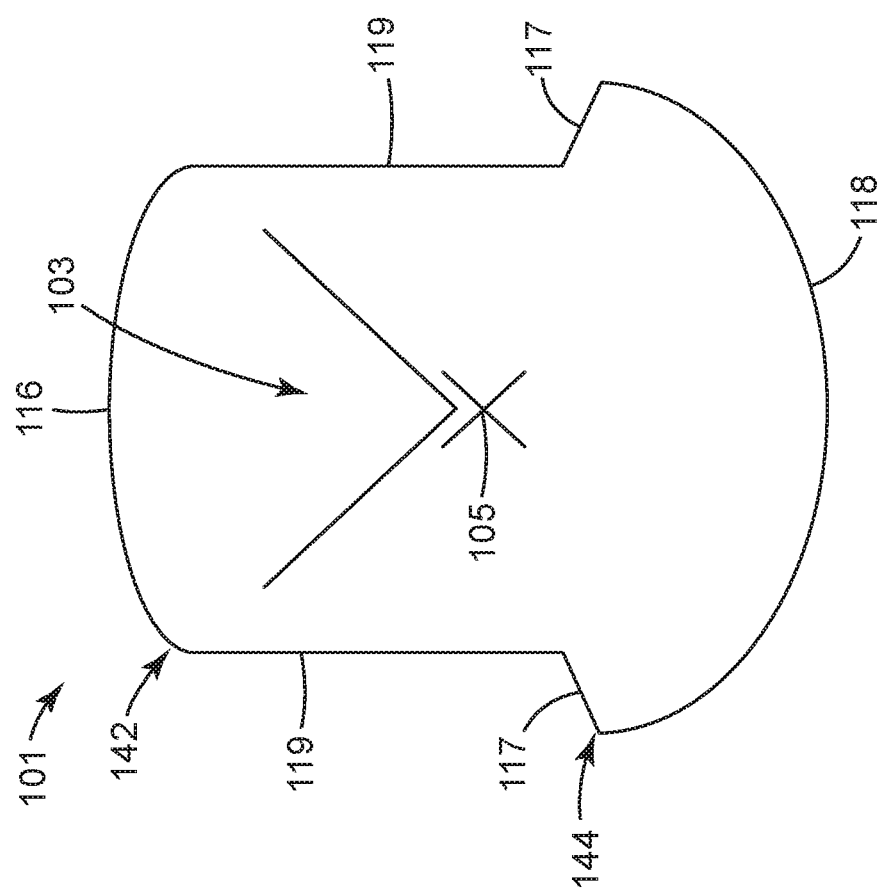
FIG. 2 is a cross sectional view of a lightguide, according to one embodiment.

In some embodiments, the body 103 of the lightguide 101 may have a mushroom cross-sectional shape as depicted in FIG. 2. In the depicted embodiment, the body 103 includes a top portion 142 disposed on, or coupled to, a bottom portion 144. The top portion 142 may be narrower than the bottom portion 144 and may define the first major side 116 and the light extracting structures 130 (not shown) of the lightguide 101 disposed thereon. The bottom portion 144 may be wider than the top portion 142 and may define the opposite second major side 118 of the lightguide 101. The first major side 116 may be arcuate or curved and/or the second major side 118 may arcuate or curved. While as shown both the first and second major sides 116, 118 are arcuate, in some embodiments, only one of the first and second major sides 116, 118 may be arcuate while the other defines another shape such as, e.g., planar. For example, the first major side 116 may be planar while the second major side 118 is arcuate, and vice versa.

The lightguide 101 further, defines opposing third side surfaces 117 and fourth side surfaces 119. The third side surfaces 117 may extend inwardly from a corresponding outer edge of the second side 118 and the fourth side surfaces 119 may extend from an inner edge of a corresponding third side surface 117 to the first side 116. As shown, for example, the fourth side surfaces 119 may be substantially parallel and/or planar. Further, the side surfaces 117, 119 may not be planar such as arcuate, ridged, etc.

The body 103 of the lightguide 101 may be symmetric about one or more planes that extend through the optical axis 105. For example, as shown in the cross-sectional view of lightguide 101 having the mushroom-shaped cross-section in FIG. 2, the lightguide 101 may be symmetric about a vertical axis extending through the optical axis 105. In other words, when viewing the cross section of FIG. 2, the left side (i.e., left of the optical axis 105) of the lightguide 101 may mirror the right side (i.e., right of the optical axis 105) of the lightguide 101. In at least one embodiment, the lightguide 101 may be symmetric about a horizontal axis (e.g., the top portion 142 may mirror the bottom portion 144).

Referring back to FIG. 1, the array of light extracting structures 130 forms an image or pattern on the first major side 116. An incident light emitted from the light sources 102 is received by the ends 112 or 114 of the lightguide 101 which serve as an input face. The received light propagates within the lightguide 101 along the optical axis 105. In some embodiments, light propagates within the lightguide 101 primarily by undergoing total internal reflection in two orthogonal transverse directions in the x-y plane orthogonal to the optical axis 105. The propagating light can illuminate the image or pattern formed by the array of light extracting structures 130 for displaying information. The image or pattern can be, for example, one or more of a text message, one or more words, a name, an icon, a logo, a symbol, a trademark, a brand, a sign, an indicia, or any combinations thereof.

The light extracting structures 130 may be any structure configured to extract, or redirect, light propagating along the optical axis 105 in a transverse direction, e.g., a central output direction 131 towards, e.g., a target plane 150. A viewer located at the target plane 150 can directly view the image or pattern formed by the light extracting structures 130 within a viewing angle θ. More specifically, light 107 may be delivered to the first end 112 of the body 103 of the lightguide 101 by the light source 102 and may propagate in a first direction 152, and light 107 may be delivered to the second end 114 of the body 103 of the lightguide 101 by another light source 102 and may propagate in a second direction 154. The light 107 propagating in one or both directions 152, 154 may be redirected, reflected, or extracted transversely, by the light extracting structures 130 in the central, or general, output direction 131 towards the target plane 150. While the target plane 150 is located adjacent the side 118 opposite the side 116, it is to be understood that in some embodiments, the target plane 150 can be located adjacent the side 116, and light can be extracted out from the side 116.

In the depicted embodiments of FIG. 1, the light extracting structures 130 are oriented along the substantially same orientation direction substantially perpendicular to the optical axis 105. The internal surfaces 132 and 134 face the respective light sources 102 and can efficiently receive incident light 107 and redirect, reflect, or extract the received light.

In some embodiments, one or both of the first and second internal surfaces 132, 134 may include a light reflecting layer or material that may be configured to reflect light, which may increase the reflectance of the surface. For example, the first and second internal surfaces 132, 134 may include a reflective metal (e.g., silver, aluminum, gold, etc.) or reflective polymer layer. The first internal surface 132 and/or the second internal surface 134 may be adapted, or configured, to extract light propagating along the optical axis from the second side 118 of the body 103 by reflecting the propagating light toward the second side 118 primarily by total internal reflection. The first and second surfaces 134, 134 may be exposed to air on the first side 116 of the body 103. In another embodiment, filler material may fill the "notches" of the light extracting structures 130 such that the first and second internal surfaces 132, 134 are not exposed to air.

The light extracting structures 130 may be described as being notches, protrusions, and/or any other structure. As shown in FIG. 1, the light extracting structures 130 are notches located proximate (e.g., extending into) the first major side 116 of the body 103 of the lightguide 101. Each of the light extracting structures 130 defines at least the first internal surface 132 configured to reflect light 107 traveling, or propagating, in the first direction 152 along the optical axis 105 and the second internal surface 134 configured to reflect light 107 traveling, or propagating, in the second direction 154 along the optical axis 105. As shown, the first and second internal surfaces 132, 134 may be substantially planar (e.g., lying along a plane). In other embodiments, the first and/or second surfaces 132, 134 may not be substantially planar such as, e.g., arcuate.

Figure 3B:
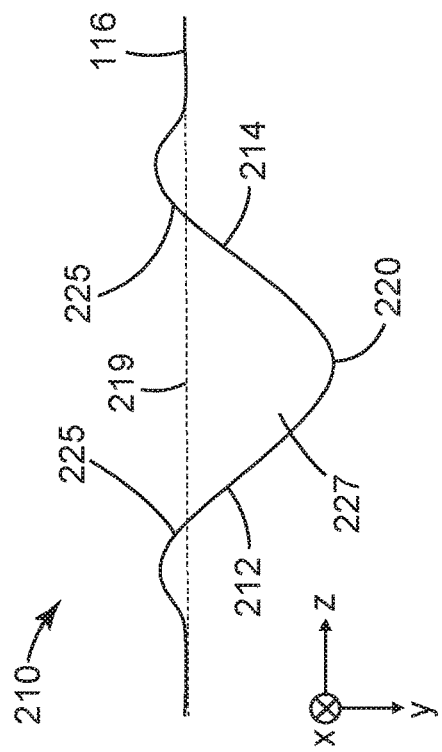
FIG. 3B is a cross sectional view of the light extracting structure of FIG. 3A.
Figure 3A:
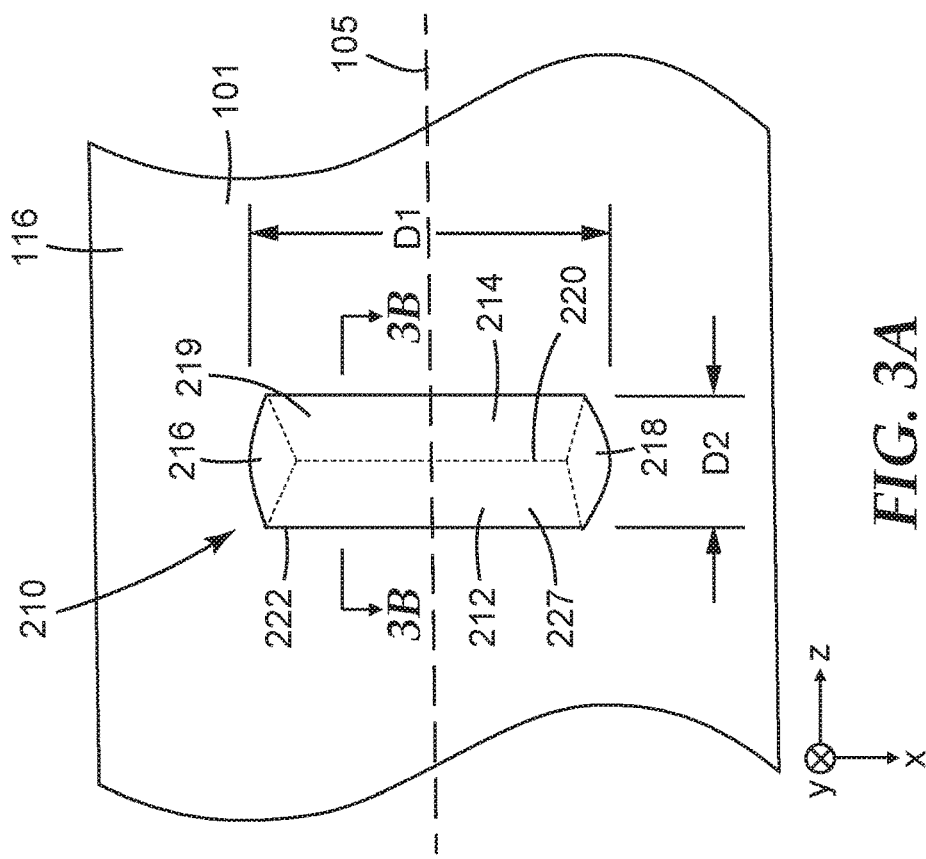
FIG. 3A is a top view of a light extracting structure on a lightguide, according to one embodiment.

FIGS. 3A-3B show plan and cross-sectional views respectively of a light extracting structure 210 having a notch structure. The light extracting structure 210 may correspond to any of the light extracting structures 130 of FIG. 1 disposed on the first major side 116 of the lightguide 101. The light extracting structure 210 includes opposing inclined first and second sidewalls 212 and 214 extending from the first major side 116 of the lightguide 101 toward the optical axis 105 of the lightguide 101 and meeting at a peak 220. The inclined sidewalls 212 and 214 may correspond to the internal surfaces 132 and 134 of FIG. 1. The peak 220 can be a point, a line, a curve, or a plane. In the depicted embodiment, the peak 220 extends along a first direction (x-direction) substantially perpendicular to the optical axis 105 (which is parallel to z-direction). The first and second sidewalls 212 and 214 are adapted to extract light propagating along the lightguide 101 out of the lightguide from a side opposite to the first side 116 (corresponding to the second side 118 of FIG. 1) by reflecting the propagating light toward the second side 118.

The light extracting structure 210 also includes opposing first and second endwalls 216 and 218 extending between the first and second sidewalls 212 and 214 from the first side 116 of the lightguide 101 to the peak 220 to form a cavity or notch 227 extending into the core 109 of the lightguide 101. In the depicted embodiment, the endwalls 216 and 218 have a generally triangular shape. In some embodiments, the endwalls may have other regular or irregular shapes. The sidewalls 212 and 214, and the endwalls 216 and 218 define an opening 219 on the first side 116 of the lightguide 101. In some embodiments, the endwalls 216 and 218 may extract light in an amount significantly lower than the sidewalls 212 and 214.

In some embodiments, when the light extracting structure 210 has a geometric shape other than a notch, for example, conic shape, elliptical shape, hemisphere shape, etc., the light extracting structure 210 may include an inclined sidewall that defines the periphery of the light extracting structure. The inclined sidewall may have a portion extending primarily along the optical axis 105 and another portion extending primarily perpendicular to the optical axis 105.

In some embodiments, as shown in FIG. 3B, the notch 227 has raised edges 225 along at least a portion of the closed perimeter 222 of the light extracting structure 210. For example, the notch 227 may have raised edges at least along the first and second endwalls 216 and 218 and/or the notch 227 may have raised edges 225 at least along the first and second sidewall 212 and 214 as illustrated in FIG. 4B. In some embodiments, each cavity or notch 227 has a raised edge along at least 50% (or at least 60%, or at least 70%) of the closed perimeter 222. The raised edges 225 may be formed when the light extracting structure 210 is formed by designing a mold used to injection mold the lightguide 101 to include these features. Alternatively, the light extracting structure 210 may be made by embossing or laser ablation and the raised edges 225 may be formed during the embossing or laser ablation process. Any of the light extracting structures described herein may be laser-ablated light extraction structures and may include raised edges along a least a portion of a perimeter of the light extracting structure. The raised edges may include material from the core of the lightguide.

The sidewalls 212 and 214 and endwalls 216 and 218 are collectively a plurality of sides of the light extracting structure 210. The plurality of sides include sides (sidewalls 212 and 214) extending primarily along a first direction (the x-direction) substantially perpendicular to the optical axis 105 (which is parallel to the z-direction). The plurality of sides also include sides (endwalls 216 and 218) extending primarily along a second direction (the z direction) which are substantially parallel to the optical axis 105.

The light extracting structure 210 has a transverse dimension D1 in a direction substantially perpendicular to the optical axis 105 (e.g., along the x axis). The transverse dimension D1 may correspond to the width of opening 219 between the endwalls 216 and 218. The light extracting structure 210 has a longitudinal dimension D2 in a direction substantially parallel to the optical axis 105 (e.g., along the z axis). The longitudinal dimension may correspond to the width of opening 219 between the sidewalls 212 and 214. In some embodiments, the ratio D1/D2 may be in the range, for example, from about 0.2 to about 5, or from about 0.5 to about 2. In some embodiments, the ratio D1/D2 may be greater than one. That is, the light extracting structure 210 may have a majority of its sidewalls facing the light source(s) to receive and re-direct light.

In some embodiments, the transverse dimension D1 and the longitudinal dimension D2 of the light extracting structure 210 may be in a range of, for example, from about 0.01 mm to about 10 mm. In some embodiments, the transverse dimension D1 and the longitudinal dimension D2 may be substantially the same. In some embodiments, the transverse dimension D1 may be, for example, about 1.2 times greater, 1.5 times greater, or 2 times greater than the longitudinal dimension D2. In some embodiments, the transverse dimension D2 may be, for example, about 1.2 times greater, 1.5 times greater, or 2 times greater than the longitudinal dimension D1.

While FIGS. 3A-B illustrate a light extracting structure having a notch shape, it is to be understood that in some embodiments, the light extracting structure described herein may have a conic shape, a hemisphere shape, etc. In general, the light extracting structure described herein may include one or more inclined walls configured to reflect and extract light that would otherwise be confined and propagate within a lightguide (e.g., the lightguide 101 of FIG. 1) along an optical axis (e.g., the optical axis 105 of FIG. 1) of the lightguide primarily by total internal reflection.

In some embodiments, the light extracting structure may have directionally dependent extraction efficiencies, in particular for an azimuthally asymmetric light extractor. For example, the light extracting structure 210 of FIG. 3A may have a first extraction efficiency for light incident along an azimuthal direction substantially parallel to the optical axis 105, while having a second extraction efficiency for light incident along another azimuthal direction substantially perpendicular to the optical axis 105. The ratio of the first and second extraction efficiencies may depend on variables including, for example, the geometry of the structure. In some embodiments, the light extracting structure may have an azimuthally symmetric structure (e.g., a conic shape, a hemisphere shape, etc.), and an extraction efficiency of the light extracting structure may not be directional dependent, and the above first and second extraction efficiencies may be substantially the same.

FIG. 4A illustrates an exemplary image or pattern 300 formed by an array of light extracting structures 302 on the first major side 116 of the lightguide 101. The image 300 is pixelated into an array of pixels. Each pixel is a single light extractor (e.g., the light extracting structures 302 each can be the light extracting structure 130 of FIG. 1, the light extracting structure 210 of FIGS. 3A-B, or any other suitable light extracting structure). In the depicted embodiment, the light extracting structures 302 are discrete, spaced apart with each other. The light extracting structures 302 are preferentially oriented along a same orientation direction. In the depicted embodiment, each of the light extracting structures 302 is oriented to be substantially perpendicular to the optical axis 105 such that the light extracting structures 302 each can efficiently receive light rays propagating within the lightguide 101 along the optical axis 105 (e.g., the z axis), and extract the received light out of the lightguide 101 to display information for a viewer located at, for example, the target plane 150 of FIG. 1. In some embodiments, each of the light extracting structures 302 can include one or more inclined walls (e.g., sidewalls 212 and 214 of FIG. 3A) to extract light that would otherwise be confined and propagate within the lightguide 101 along the optical axis, e.g., primarily by total internal reflection. The one or more inclined walls of the light extracting structure 302 may extend primarily along a direction substantially perpendicular to the optical axis 105.

The image 300 has a first elongated portion 310 that is primarily longitudinally oriented, e.g., extending primarily in a direction substantially parallel to the optical axis 105. The first elongated portion 310 is pixelated into an array of pixels. Each pixel include a single light extracting structure 302. In some embodiments, the array of light extracting structures 302 of the first elongated portion 310 are arranged with substantially the same orientation.

The image 300 further includes a second elongated portion 320 that is primarily transversely oriented, e.g., extending primarily in a direction substantially perpendicular to the optical axis 105. In the depicted embodiment, the second elongated portion 320 is also pixelated into an array of pixels. Each pixel include a single light extracting structure 302. In some embodiments, the array of light extracting structures 302 of the second elongated portion 320 are arranged with substantially the same orientation. The array of light extracting structures of the second elongated portion 320 may be the same as or different from the light extracting structures of the first elongated portion 310.

The lightguide 101 of FIG. 4A including the pixelated image 300 can provide relatively uniform light extraction for displaying the image 300 to a viewer. This can be further illustrated by comparing the image 300 of FIG. 4A and an image 300' of FIG. 4B. The image 300' of FIG. 4B includes first and second elongated portions 310' and 320' corresponding to the first and second elongated portions 310 and 320 of the image 300 of FIG. 4A, respectively. Instead of being pixelated into an array of pixels each including a single light extracting structure, the first elongated portion 310' of the image 300' in FIG. 3B is formed by a single light extracting structure 302'. The light extracting structure 302' includes one or more sidewalls 302'a. As shown in FIG. 4B, a major portion of the sidewall 302'a extends primarily along a direction substantially parallel to the optical axis 105. The light extracting structure 302' has a transverse dimension D1' that is a width of the first elongated portion 310', and a longitudinal dimension D2' that is a length of the first elongated portion 310'. The longitudinal dimension D2' is significantly greater than the transverse dimension D1'. For example, D2' may be at least 1.5 times greater, at least 2 times greater, at least 3 times greater, at least 4 times greater, or at least 5 times greater that D1'. The second elongated portion 320' is also formed by a single light extracting structure 304'. The light extracting structure 304' includes one or more sidewalls 304'a. As shown in FIG. 4B, a major portion of the sidewall 304'a extends primarily along a direction substantially perpendicular to the optical axis 105. The light intensity extracted by the light extracting structure 302' of first elongated portion 310' may be substantially weaker than the light extracting structure 304' of second elongated portion 320' due to directionally dependent extraction efficiencies. This may introduces undesired uniformity for the displayed image (e.g., much brighter second portion 320' compared to the first portion 310').

Referring back to FIG. 4A, by pixelating the first elongated portion 310 into array of pixels each including a single light extractor 302, the light extraction efficiency can be increased. Each of light extracting structures 302 of the first elongated portion 310 can efficiently extract incident light along the optical axis 105. In some embodiments, the light extraction efficiency of the first elongated portion 310 may be substantially the same as that of the second elongated portion 320. In some embodiments, an intensity of light exiting the lightguide 101 from each pixel (e.g., the light extracting structures 302) along a viewing direction (e.g., along the y axis) does not differ by greater than 40%, greater than 30%, greater than 20%, or greater than 10% from an average intensity for all light exiting the lightguide 101 from the array of pixels along the viewing direction.

Lightguides including a pixelated image or pattern will be further illustrated in FIGS. 5A-B. As shown in FIG. 5A. The lightguide 101 includes the major side 116 and an image or pattern 500 formed on the major side 116. The image 500 includes a first elongated portion 510 and a second elongated portion 520. The first elongated portion 510 extends primarily along a direction (e.g., the z axis) substantially parallel to the optical axis 105. The second elongated portion 520 extends primarily along a direction (e.g., the x axis) substantially perpendicular to the optical axis 105. In some embodiments, the first elongated portion 510 may include at least one minor sub-portion 512 (512' in FIG. 5B) that extends primarily along a direction substantially perpendicular to the optical axis 105. The total length of the at least one minor sub-portion 512 may be, for example, less than 45%, less than 30%, less than 15%, less than 10%, or less than 5% of the total length of the first elongated portion 510.

The first elongated portion 510 is pixelated into an array of pixels. Each pixel include a single light extracting structure 502. The light extracting structures 502 each can be, for example, the light extracting structure 130 of FIG. 1, the light extracting structure 210 of FIGS. 3A-B, or any other suitable light extracting structures that can extract light that would otherwise be confined and propagate within the lightguide 101 along the optical axis 105 primarily by total internal reflection. As shown in FIG. 5A, the first elongated portion 510 is indicated by envelopes 510e of the array of light extracting structures 502. The envelopes 510e can be curves that are tangent to each of the light extracting structures 502 at some point. The light extracting structures 502 can be arranged inside the envelopes 510e with a line density of, for example, no less than 2 dots per inch (dpi), no less than 10 dots per inch (dpi), no less than 50 dpi, no less than 100 dpi, or no less than 200 dpi, depending on the specific applications, e.g., various sizes of a logo, resolution of the logo, etc.

The adjacent light extracting structures 502 offset with each other with a nearest neighbor distance (NND) which is measured between the respective center points of the adjacent light extracting structures 502. In some embodiments, the array of light extracting structures 502 may uniformly fill the first elongated portion 510 with substantially the same NNDs. That is, the standard deviation of the NNDs is for example, less than 20%, less than 10%, or less than 5% of the average of NNDs.

The first elongated portion 510 has a width w as measured between the envelops 510e. In some embodiments, the ratio of NND and the width w may be in the range of, for example, from about 0.2 to about 5, or about 0.5 to about 2.

In the embodiment of FIG. 5A, the light extracting structures 502 are discrete and spaced apart with a gap g. The gap may have a value of, for example, less than 50%, less than 40%, less than 30%, less than 20%, less than 10%, or less than 5% of the nearest neighbor distance (NND). In some embodiments, at least two adjacent light extracting structures are collinear along the optical axis 105.

In some embodiments, the adjacent light extracting structures 502 may be overlapped. The overlapped portion has a length along a direction of the nearest neighbor distance (NND) shown in FIG. 5A, and the length may be, for example, less than 50%, less than 40%, less than 30%, less than 20%, less than 10%, or less than 5% of the nearest neighbor distance (NND).

As shown in FIG. 5A, the space 510s between the envelopes 510e is at least partially filled by the array of light extracting structures 502. The level of filling refers to a filling factor. In some embodiments, at least 50%, at least 70%, at least 80%, at least 90%, or at least 95% of the space 510s may be filled by the array of light extracting structures 502, or the filling factor of the first elongated portion is at least 50%, at least 70%, at least 80%, at least 90%, or at least 95%. In some embodiments, no more than 80%, no more than 90%, no more than 95%, or no more than 99% of the space 510s may be filled by the array of light extracting structures 502, or the filling factor of the first elongated portion is no more than 80%, no more than 90%, no more than 95%, or no more than 99%.

In some embodiments, the minor sub-portion 512 of the first elongated portion 510 may be formed by a single light extracting structure extending primarily along the x axis, instead of being pixelated into multiple pixels each including a single light extracting structure.

In some embodiments, the array of light extracting structures 502 of the first elongated portion 510 are arranged with substantially the same orientation. Each of the light extracting structures 502 of the first elongated portion 510 can include one or more inclined sidewalls (e.g., sidewalls 212 and 214 of FIG. 3A) that are configured to receive light from the light source 102, and redirect, reflect, or extract light that would otherwise be confined and propagate within the lightguide 101 along the optical axis.

The second elongated portion 520 may include a minor sub-portion 522 (522' in FIG. 5B) that extends primarily along a direction substantially parallel to the optical axis 105. In some embodiments, the length of the minor sub-portion 522 may be, for example, less that 45%, less than 30%, less than 15%, or less than 5% of the length of the second elongated portion 520. In the embodiment depicted in FIG. 5A, the second elongated portion 520 is formed by a single, continuous light extracting structure 504 which includes one or more sidewall 504a primarily facing the incident light 102 to extract the received light. In some embodiments, the minor sub-portion 522 may be pixelated into multiple pixels each including a single light extracting structure such as the light extracting structure 502.

In the embodiment depicted in FIG. 5B, first and second elongated portions 510' and 520' each are pixelated into an array of pixels each including a single light extracting structure 502 or 502'. The light extracting structure 502' may be the same as or different from the light extracting structure 502.

As shown in an image 500' of FIG. 5B, the first elongated portion 510' is indicated by envelopes 510e' of the array of light extracting structures 502. The envelopes 510e' can be curves that are tangent to each of the adjacent light extracting structures 502 at some point. Along the width direction, the first elongated portion 510' is pixelated into two adjacent pixels each including a single light extracting structure 502. It is to be understood that in some embodiments, the first elongated portion 510 or 510' can be pixelated into one or more adjacent pixels along the width direction. When a higher resolution is required for specific applications, more pixels along the length and/or width direction may be preferred. The light extracting structures 502 can be arranged inside the envelopes 510e' with a line density of, for example, no less than 2 dots per inch (dpi), no less than 10 dpi, no less than 50 dpi, no less than 100 dpi, or no less than 200 dpi.

In some embodiments, the first elongated portion 510 or 510' may further include optional light extracting structures 503 disposed between adjacent light extracting structures 502 (see FIG. 5A). In some embodiments, the optional light extracting structures 503 may connect the adjacent light extracting structures 502, and change the discrete, spaced apart array of light extracting structures 502 into a pseudo-continuous structure that may reduce possible visual artifacts.

The image 500 or 500' can be, for example, one or more of a text message, one or more words, a name, an icon, a logo, a symbol, a trademark, a brand, a sign, an indicia, or any combinations thereof. In some embodiments described herein, the image or pattern formed by the array of light extracting structures is illuminated for displaying information. The illuminated image or pattern is for direct viewing of a viewer, which requires light uniformities across the image and cosmetic effects.

Exemplary embodiments of the present disclosure may take on various modifications and alterations without departing from the spirit and scope of the present disclosure.

Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Listing of Exemplary Embodiments

It is to be understood any one of embodiments 1-18, and 19-20 can be combined.

Embodiment 1 is a lightguide centered on an optical axis and adapted to receive an incident light from an input face of the lightguide, the received light propagating within the lightguide along the optical axis, the lightguide comprising:
- a lightguide body extending along the optical axis, the lightguide body comprising a major side including an image formed thereon, the propagating light illuminating the image formed on the major side for displaying information,
- the image comprising a first elongated portion and a second elongated portion, the first elongated portion extending primarily along a first direction substantially parallel to the optical axis, and the second elongated portion extending primarily along a second direction substantially perpendicular to the optical axis, and
- the first elongated portion being pixelated into an array of pixels, each pixel comprising a single light extracting structure adapted to receive the propagating light within the lightguide along the optical axis and extract the received light transversely out of the lightguide.

Embodiment 2 is the lightguide of embodiment 1, wherein the light extracting structures of the first elongated portion are preferentially oriented along a same orientation direction.

Embodiment 3 is the lightguide of embodiment 1 or 2, wherein an intensity of light exiting the lightguide from each pixel of the first elongated portion along a viewing direction does not differ by greater than 20% from an average intensity for all light exiting the lightguide from the array of pixels along the viewing direction.

Embodiment 4 is the lightguide of any one of embodiments 1-3, wherein the second elongated portion comprises a single light extracting structure that is longer than at least one of the light extractors of the first elongated portion.

Embodiment 5 is the lightguide of any one of embodiments 1-4, wherein the second elongated portion is pixelated into an array of pixels, each pixel comprising a single light extracting structure.

Embodiment 6 is the lightguide of embodiment 5, wherein the light extracting structures of the second elongated portion are substantially the same as that of the first elongated portion.

Embodiment 7 is the lightguide of any one of embodiments 1-6, wherein each light extractor extracts substantially more light when receiving light rays propagating within the lightguide along a first direction substantially parallel to the optical axis and substantially less light when receiving light rays propagating within the lightguide along a second direction substantially perpendicular to the optical axis.

Embodiment 8 is the lightguide of any one of embodiments 1-7, wherein at least two adjacent light extracting structures are collinear along the optical axis.

Embodiment 9 is the lightguide of any one of embodiments 1-8, wherein the image includes one or more of a text message, one or more words, a name, an icon, a logo, a symbol, a sign, a trademark, a brand, an indicia, or a combination thereof.

Embodiment 10 is the lightguide of any one of embodiments 1-9, wherein the sign of a slope for a curve of a pixel spacing versus a longitudinal position of the array of pixels changes at least two times.

Embodiment 11 is the lightguide of any one of embodiments 1-10, wherein nearest neighbor distances (NNDs) of the adjacent light extracting structures of the first elongated portion are substantially the same.

Embodiment 12 is the lightguide of any one of embodiments 1-11, wherein the first elongated portion has a filling factor of at least 50%.

Embodiment 13 is the lightguide of any one of embodiments 1-12, wherein the light extracting structures are notch shaped, conic shaped, or hemisphere shaped.

Embodiment 14 is the lightguide of any one of embodiments 1-13, wherein the adjacent light extracting structures of the first elongated portion are discrete and spaced apart with a gap.

Embodiment 15 is the lightguide of embodiment 14, wherein the first elongated portion further comprises a second light extracting structure disposed within the gap.

Embodiment 16 is the lightguide of any one of embodiments 1-15, wherein the adjacent light extracting structures of the first elongated portion are overlapped.

Embodiment 17 is the lightguide of any one of embodiments 1-16, wherein the lightguide is solid lightguide with the received light propagating within the lightguide along the optical axis primary by undergoing total internal reflection (TIR), or the lightguide is a hollow lightguide where the lightguide body has a hollow inside.

Embodiment 18 is the lightguide of any one of embodiments 1-17 being a fiber lightguide.

Embodiment 19 is a method of making a lightguide, comprising:
- providing a lightguide centered on an optical axis and adapted to receive an incident light from an input face of the lightguide, the received light propagating within the lightguide along the optical axis, the lightguide comprising a lightguide body extending along the optical axis, the lightguide body comprising a major side;
- forming an image on the major side of the lightguide body, the propagating light being capable of illuminating the image formed on the major side for displaying information,
- wherein the image comprises a first elongated portion and a second elongated portion, the first elongated portion extending primarily along a first direction substantially parallel to the optical axis, and the second elongated portion extending primarily along a second direction substantially perpendicular to the optical axis, and
- wherein the first elongated portion is pixelated into an array of pixels, each pixel comprising a single light extracting structure adapted to receive the propagating light within the lightguide along the optical axis and extract the received light transversely out of the lightguide.

Embodiment 20 is the method of embodiment 19, wherein the light extracting structures are laser-ablated light extracting structures.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Example

Figures 6A, 6B:
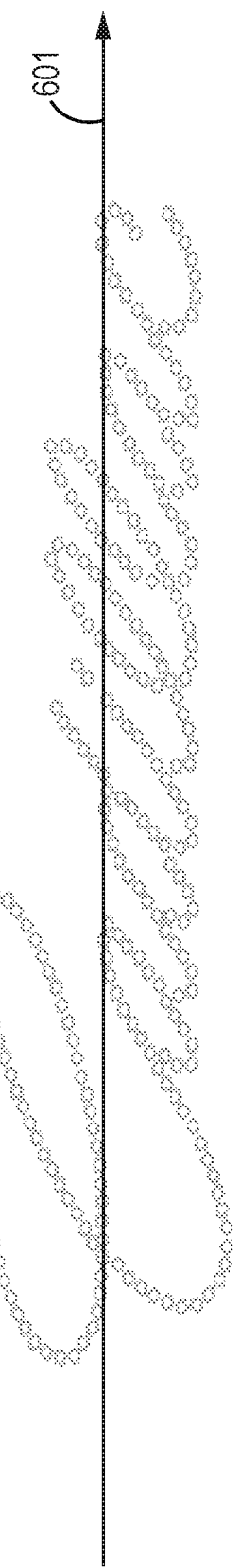
FIG. 6A is a logo to be formed on a lightguide.
FIG. 6B is a top view of the logo of FIG. 6A which is pixelated into an array of light extractors formed on a lightguide, according to the Example.
Figure 6C:
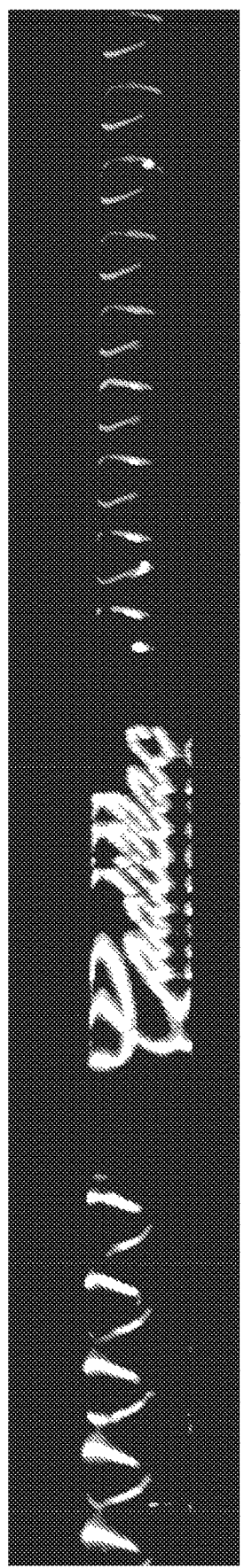
FIG. 6C is the logo of FIG. 6B being illuminated.

A logo of "Cadillac" (trademark from General Motors, Detroit, MI) is shown in FIG. 6A with continuous lines, and the logo with discrete light extractors (pixels) is shown in FIG. 6B. The logo includes various elongated portions extending primarily longitudinally or transversely. The pattern in FIG. 6B was made into an acrylic solid guide using laser ablation. The solid guide was mushroom shaped with 7 mm in diameter having a configuration as shown in FIG. 2. A LED (Osram CN5M) was used to inject light from an end, and the illuminated logo is shown in FIG. 6C which is uniformly illuminated across the pattern.

Figure 6D:
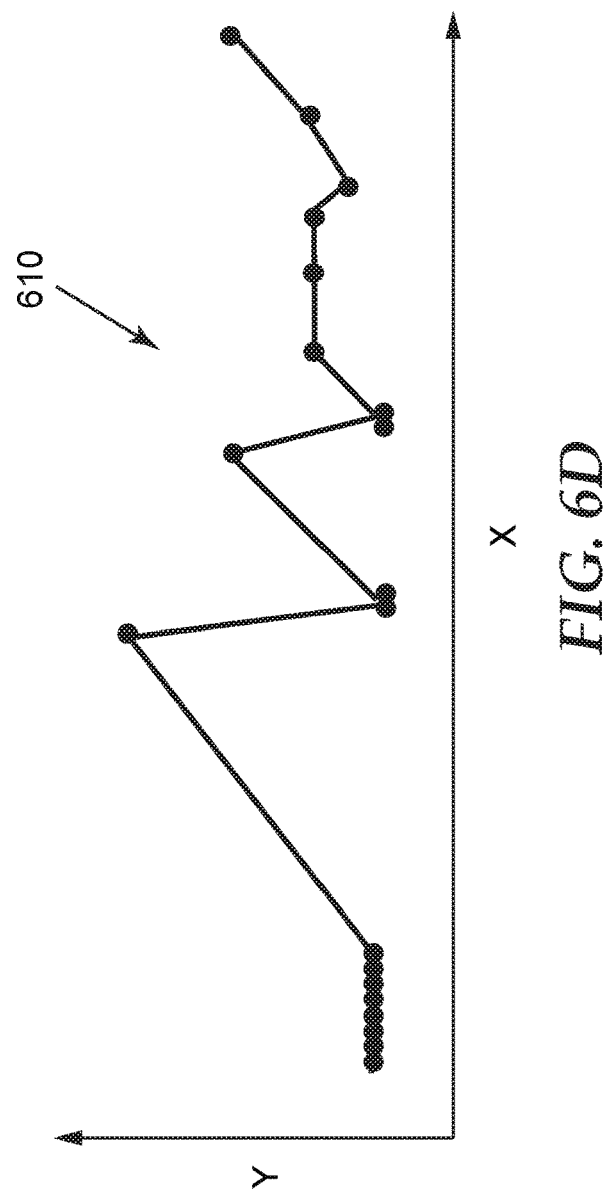
FIG. 6D illustrates a curve showing the spacing between adjacent light extractors located on a cross-line of FIG. 6B versus the positions of the light extractors along the cross-line.

FIG. 6D illustrates a curve 610 showing the spacing between adjacent light extractors located on the cross-line 601 of FIG. 6B versus the positions of the light extractors along the cross-line 601. As shown in FIG. 6D, the sign of the slope along the pixel spacing versus position curve 610 for at least one of the multiple rows of pixels changes at least 2 times.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A lightguide centered on an optical axis and adapted to receive an incident light from an input face of the lightguide, the received light propagating within the lightguide along the optical axis, the lightguide comprising:

a lightguide body extending along the optical axis, the lightguide body comprising a major side including a pattern of light extracting structures formed thereon, each of the light extracting structures being adapted to receive a portion of the propagating light within the lightguide along the optical axis and extract the received light transversely out of the lightguide, the propagating light illuminating the pattern of light extracting structures for displaying information, the pattern of light extracting structures comprising a first elongated portion and a second elongated portion, the first elongated portion extending primarily along a first direction substantially parallel to the optical axis, and the second elongated portion extending primarily along a second direction substantially perpendicular to the optical axis, the first elongated portion comprising a first array of light extracting structures, and the second elongated portion comprising an elongated light extracting structure extending primary along the second direction thereof.

2. The lightguide of claim 1, wherein the light extracting structures of the first elongated portion are preferentially oriented along a same orientation direction.

3. The lightguide of claim 1, wherein an intensity of light exiting the lightguide from each light extracting structure of the first elongated portion along a viewing direction does not differ by greater than 20% from an average intensity for all light exiting the lightguide from the array of light extracting structures along the viewing direction.

4. The lightguide of claim 1, wherein the elongated light extracting structures of the second elongated portion is longer than at least one of the light extracting structures of the first elongated portion.

5. The lightguide of claim 1, wherein the second elongated portion further comprises a second array of light extracting structures.

6. The lightguide of claim 5, wherein the light extracting structures of the second elongated portion are substantially the same as that of the first elongated portion.

7. The lightguide of claim 1, wherein each of the light extracting structures extracts substantially more light when receiving light rays propagating within the lightguide along a first direction substantially parallel to the optical axis and substantially less light when receiving light rays propagating within the lightguide along a second direction substantially perpendicular to the optical axis.

8. The lightguide of claim 1, wherein at least two adjacent light extracting structures are collinear along the optical axis.

9. The lightguide of claim 1, wherein the displayed information includes one or more of a text message, one or more words, a name, an icon, a logo, a symbol, a sign, a trademark, a brand, an indicia, or a combination thereof.

10. The lightguide of claim 1, wherein a sign of a slope for a curve of a light extracting structure spacing versus a longitudinal position of the array of light extracting structures changes at least two times.

11. The lightguide of claim 1, wherein nearest neighbor distances (NNDs) of the adjacent light extracting structures of the first elongated portion are substantially the same.

12. The lightguide of claim 1, wherein the first elongated portion has a filling factor of at least 50%.

13. The lightguide of claim 1, wherein the light extracting structures are notch shaped, conic shaped, or hemisphere shaped.

14. The lightguide of claim 1, wherein the adjacent light extracting structures of the first elongated portion are discrete and spaced apart with a gap.

15. The lightguide of claim 14, wherein the first elongated portion further comprises a second light extracting structure disposed within the gap.

16. The lightguide of claim 1, wherein the adjacent light extracting structures of the first elongated portion are overlapped.

17. The lightguide of claim 1, wherein the lightguide is a solid lightguide, and the received light propagates within the lightguide along the optical axis primarily by undergoing total internal reflection (TIR).

18. The lightguide of claim 1, wherein the lightguide body has a hollow inside.

19. A method of making a lightguide, comprising:

providing a lightguide centered on an optical axis and adapted to receive an incident light from an input face of the lightguide, the received light propagating within the lightguide along the optical axis, the lightguide comprising a lightguide body extending along the optical axis, the lightguide body comprising a major side;

forming a pattern of light extracting structures on the major side of the lightguide body, each of the light extracting structures being adapted to receive a portion of the propagating light within the lightguide along the optical axis and extract the received light transversely out of the lightguide, the propagating light being capable of illuminating the pattern of light extracting structures for displaying information, wherein the pattern of light extracting structures comprises a first elongated portion and a second elongated portion, the first elongated portion extending primarily along a first direction substantially parallel to the optical axis, and the second elongated portion extending primarily along a second direction substantially perpendicular to the optical axis, and wherein the first elongated portion comprises a first array of light extracting structures, and wherein the second elongated portion comprises an elongated light extracting structure extending primarily along the second direction thereof.

20. The method of claim 19, wherein the light extracting structures are laser-ablated light extracting structures.

* * * * *

UNITED STATES PATENT AND TRADEMARK OFFICE
CERTIFICATE OF CORRECTION

PATENT NO. : 10,509,157 B2
APPLICATION NO. : 15/751213
DATED : December 17, 2019
INVENTOR(S) : Tao Liu Page 1 of 1

It is certified that error appears in the above-identified patent and that said Letters Patent is hereby corrected as shown below:

In the Claims

<u>Column 16</u>
Line 42, In Claim 1, delete "primary" and insert -- primarily --, therefor.
Line 54, In Claim 4, delete "structures" and insert -- structure --, therefor.

Signed and Sealed this
Seventh Day of July, 2020

Andrei Iancu
*Director of the United States Patent and Trademark Office*